United States Patent
Jokinen

(10) Patent No.: US 10,895,647 B2
(45) Date of Patent: Jan. 19, 2021

(54) SYSTEM AND METHOD FOR TRANSFORMING ATMOSPHERIC CORRECTIONS BETWEEN CORRECTION SYSTEMS

(71) Applicant: NovAtel Inc., Calgary (CA)

(72) Inventor: Altti Samuli Jokinen, Calgary (CA)

(73) Assignee: NovAtel Inc., Calgary (CA)

( * ) Notice: Subject to any disclaimer, the term of this patent is extended or adjusted under 35 U.S.C. 154(b) by 342 days.

(21) Appl. No.: 15/994,533

(22) Filed: May 31, 2018

(65) Prior Publication Data
US 2019/0369265 A1 Dec. 5, 2019

(51) Int. Cl.
*G01S 19/41* (2010.01)
*G01S 19/07* (2010.01)

(52) U.S. Cl.
CPC .............. *G01S 19/41* (2013.01); *G01S 19/07* (2013.01); *G01S 19/072* (2019.08)

(58) Field of Classification Search
CPC .......... G01S 19/40; G01S 19/41; G01S 19/07; G01S 19/072
See application file for complete search history.

(56) References Cited

U.S. PATENT DOCUMENTS

| | | | | |
|---|---|---|---|---|
| 6,061,632 A | * | 5/2000 | Dreier | G01S 19/07 701/470 |
| 6,531,981 B1 | * | 3/2003 | Fuller | G01S 19/07 342/357.48 |
| 6,862,526 B2 | * | 3/2005 | Robbins | G01S 19/04 701/469 |

(Continued)

FOREIGN PATENT DOCUMENTS

| | | | |
|---|---|---|---|
| JP | 2017 129555 | 7/2017 | |
| JP | 2017129555 | * 7/2017 | ............. G01S 19/41 |
| WO | 2014063584 | 5/2014 | |

OTHER PUBLICATIONS

Li, Liang et al. "Real-Time Single Frequency Precise Point Positioning Using SBAS Corrections." Sensors 2016. pp. 1-13 (Year: 2016).*

Schmitz, Martin et al. "SSR Technology for Scalable Real-Time GNSS Applications." Geo++ GmbH . Sep. 11-15, 2017. pp. 1-36 ) (Year: 2017).*

(Continued)

*Primary Examiner* — Gregory C. Issing

(74) *Attorney, Agent, or Firm* — Cesari and McKenna, LLP

(57) ABSTRACT

A Global Navigation Satellite System (GNSS) receiver at a client device receives first correction data from a first correction system that includes, but is not limited to, a first orbit correction value, a first clock correction value, and a first code or phase bias correction value. The GNSS receiver also receives second correction data from a second correction system that includes, but is not limited to, a second orbit correction value, a second clock correction value, a second code or phase bias correction value, and an atmospheric correction value. The GNSS receiver determines a difference between a sum of the first correction data and a sum of the second correction data to calculate a difference value that is utilized to adjust the atmospheric correction value received from the second correction system. The adjusted correction value may be utilized with the first correction data to determine position while mitigating errors.

20 Claims, 3 Drawing Sheets

(56) References Cited

U.S. PATENT DOCUMENTS

| | | | |
|---|---|---|---|
| 7,511,661 B2* | 3/2009 | Hatch | G01S 19/41 |
| | | | 342/357.31 |
| 2016/0370466 A1* | 12/2016 | Rougerie | G01S 19/396 |
| 2016/0377730 A1* | 12/2016 | Drescher | G01S 19/07 |
| | | | 342/357.23 |

OTHER PUBLICATIONS

Skone et al, "Wide Area Navigation Algorithm for Marine DGPS Users under Disturbed Ionospheric Conditions" GNSS 2004—Proceedings of the 17th International Technical Meeting of the Satellite Division of the Institute of Navigation (ION GNSS 2004), Manassas, VA, Sep. 24, 2004, pp. 1256-1265.

European Search Report dated Oct. 10, 2019 for corresponding European Patent Application No. EP 19 17 5242, 9 pages.

* cited by examiner

SYSTEM AND METHOD FOR TRANSFORMING ATMOSPHERIC CORRECTIONS BETWEEN CORRECTION SYSTEMS

BACKGROUND

Technical Field

The invention relates generally to a Global Navigation Satellite System (GNSS), and more particularly, to a GNSS receiver at a client device that transforms atmospheric corrections between correction systems.

Background Information

Mitigating errors (e.g., clock errors, orbit errors, bias errors, atmosphere errors, and/or multipath errors, etc.) is fundamental to the performance of a Global Navigation Satellite System (GNSS) receiver. The more errors the GNSS receiver can mitigate, the higher degree of positioning accuracy the GNSS receiver can achieve.

The GNSS receiver may receive correction data from one or more correction systems and use the correction data thus resulting in decimeter-level or better positioning accuracy. A typical solution utilizing the correction data requires a period of time (e.g., hours) to converge to the decimeter-level or better positioning accuracy. The actual accuracy achieved and the convergence time required is dependent on the quality of the correction data.

Currently, there are a variety of different systems that act as the correction providers and implement different error correction techniques to provide the correction data to GNSS receivers to mitigate the errors and enhance the positioning accuracy. Specifically, a Satellite-based augmentation System (SBAS) implements a Satellite-based Augmentation technique and provides SBAS correction data to GNSS receivers. Similarly, a Precise Point Positioning (PPP) system implements a PPP technique and provides PPP correction data to GNSS receivers.

For example, The Wide Area Augmentation System (WAAS) is an SBAS system developed by the U.S. Federal Aviation Administration (FAA) and acts as a correction provider to provide WAAS correction data (e.g., a type of SBAS correction data) to enable aircrafts to conduct precision approaches to airports. The WAAS correction data is also available free of charge to GNSS receivers being utilized by civilians in North America.

Similarly, there are several different PPP systems that act as correction providers to provide PPP correction data to GNSS receivers. For example, such PPP systems may include, but are not limited to, VERIPOS Apex® available from VERIPOS Limited, Dyce, Aberdeen, UK, TerraStar® available from TerraStar GNSS Limited, Dyce, Aberdeen, UK, OmniSTAR® available from Trimble Inc., Sunnyvale, Calif., U.S.A., and StarFire™ available from NavCom Technology, Inc., Torrance, Calif., U.S.A. Specifically, the VERIPOS system provides VERIPOS Apex® correction data (i.e., a type of PPP correction data) to GNSS receivers, while the TerraStar® system provides TerraStar® correction data (i.e., a type of PPP correction data) to GNSS receivers. Similarly, the OmniSTAR® system provides OmniSTAR® correction data (i.e., a type of PPP correction data) to GNSS receivers, while the StarFire™ system provides StarFire™ correction data (i.e., a type of PPP correction data) to GNSS receivers.

However, because each correction system utilizes its own specific algorithm(s), data, and/or information to implement an error correction technique, correction data from a particular correction system cannot be readily utilized with correction data from a different correction system. For example, atmospheric correction data from a particular correction system cannot be readily utilized with other correction data received from a different correction system.

Therefore, what is needed is a system and method for transforming correction data received from a particular correction system into a form that is useable with correction data received from a different correction system.

SUMMARY

The inventive system and method transforms atmospheric correction data between correction systems. A Global Navigation Satellite System (GNSS) receiver at a client device receives first correction data from a first correction system. Specifically, the GNSS receiver at the client device receives the first correction data from a device operating in a network associated with the first correction system. For example, the first correction data may include, but is not limited to, a first orbit correction value, a first clock correction value, and a first code or phase bias correction value, wherein the first correction data is associated with a selected GNSS satellite. The GNSS receiver at the client device sums the first orbit correction value, the first clock correction value, and the first code or phase bias correction value received from the first correction system to calculate a first total correction value representing a first full range-level correction for the selected GNSS satellite.

Further, the GNSS receiver at the client device receives second correction data from a second correction system. Specifically, the GNSS receiver at the client device receives the second correction data from a device operating in a network associated with the second correction system. For example, the second correction data may include, but is not limited to, a second orbit correction value, a second clock correction value, a second code or phase bias correction value, and an atmospheric correction value, wherein the second correction data is associated with the selected GNSS satellite. The GNSS receiver at the client device sums the second orbit correction value, the second clock correction value, and the second code or phase bias correction value received from the second correction system to calculate a second total correction value representing a second full range-level correction for the selected GNSS satellite.

The GNSS receiver at the client device determines a difference between the second total correction value and the first total correction value to calculate a full range-level correction difference value, wherein the two total correction values are associated with the same selected GNSS satellite but represent different full range-level corrections based on the different correction data received from the different correction systems.

The GNSS receiver then adjusts (i.e., transforms) the atmospheric correction value, received from the second correction system, utilizing the full range-level correction difference value to calculate an adjusted atmospheric correction value that can be utilized with the first correction data received from the first correction system. Specifically, the GNSS receiver may calculate decimeter-level or better positioning accuracy with shorter convergence time utilizing information from the GNSS satellite signals in conjunction with the first correction data and the adjusted atmospheric correction value.

Advantageously, and with the inventive system and method, atmospheric correction data received from a particular correction system (e.g., second correction system) can be utilized with correction data received from a different correction system (e.g., first correction system).

BRIEF DESCRIPTION OF THE DRAWINGS

The description below refers to the accompanying drawings, of which.

DETAILED DESCRIPTION OF AN ILLUSTRATIVE

Embodiment

Figure 1:
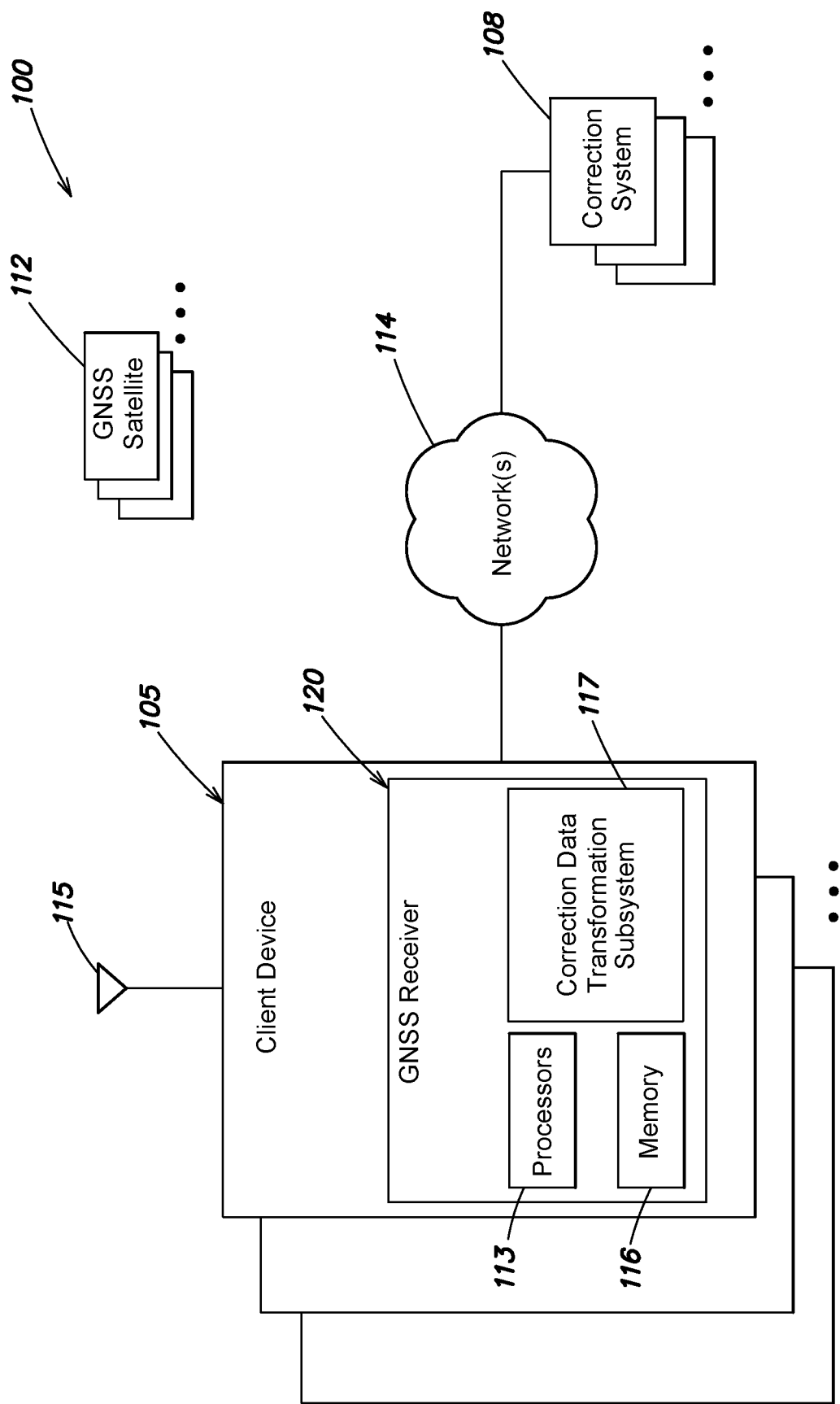
FIG. 1 depicts a system in accordance with an illustrative embodiment of the invention.

Referring to FIG. 1, a system 100 includes one or more client devices 105 having a GNSS receiver 120, one or more Global Navigation Satellite Signals (GNSS) satellites 112 that transmit one or more GNSS satellite signals, and a plurality of correction systems 108 providing correction data over network(s) 114 utilized to transmit/receive data. For example, the network 114 may be associated with an Internet Protocol (IP) based delivery system such as Long-Term Evolution (LTE) or a satellite-based delivery system such as Inmarsat. Alternatively, the network 114 may be associated with any other type of delivery system as known by those skilled in the art.

Each of the plurality of correction systems 108 operates devices (not shown) and utilizes its own specific algorithm(s), data, and/or information to implement a correction technique to produce correction data that may be provided, over the network 114, to the GNSS receiver 120 of the client device 105. The correction data may be utilized to mitigate clock errors, orbit errors, code bias errors, phase bias errors, atmospheric errors, and/or multipath errors associated with one or more GNSS satellites 112, as known by those skilled in the art. For example, the plurality of correction systems 108 may include VERIPOS Apex® available from VERIPOS Limited, Dyce, Aberdeen, UK that implements a Precise Point Positioning (PPP) technique to produce VERIPOS Apex® correction data (i.e., a type of PPP correction data) that may be provided, over the network 114, to the GNSS receiver 120. In addition or alternatively, the correction systems 108 may include TerraStar® available from TerraStar GNSS Limited, Dyce, Aberdeen, UK, OmniSTAR® available from Trimble Inc., Sunnyvale, Calif., U.S.A., and StarFire™ available from NavCom Technology, Inc., Torrance, Calif., U.S.A. that implement PPP techniques to respectively produce TerraStar®, OmniSTAR®, and StarFire™ correction data (i.e., types of PPP correction data) that may be provided, over the network 114, to the GNSS receiver 120.

In addition or alternatively, the plurality of correction systems 108 may include the Wide Area Augmentation System (WAAS), which is a Satellite-based augmentation System (SBAS) developed by The U.S. Federal Aviation Administration (FAA), that implements a SBAS technique to provide WAAS correction data (i.e., a type of SBAS correction data) to the GNSS receiver 120 over the network 114. Although reference is made to particular correction systems 108, it is expressly contemplated that the plurality of correction systems 108 may include different or additional correction systems that provide correction data over the network 114 to the GNSS receiver 120.

The client device 105 is typically capable of moving and includes an antenna 115 and the GNSS receiver 120, with one or more processors 113 and a memory 116. For example, the client device 105 may be a cellphone, laptop computer, portable computer, a personal digital assistant, etc. The GNSS receiver 120 may be a single, dual, or multi-frequency receiver.

The one or more processors 113 execute a correction data transformation subsystem 117 configured to transform (i.e., adjust) atmospheric corrections between correction systems according to one or more embodiments described herein. Specifically, atmospheric correction data associated with a selected GNSS satellite and received from a particular correction system is transformed to be used with the correction data associated with the selected GNSS satellite and received from a different correction system, as will be described in further detail below. The memory 116 may store the correction data (not shown) received from one or more of the plurality of correction systems 108, and/or store one or more transformed atmospheric correction values (not shown).

The one or more processors 113 calculate position utilizing information from the GNSS signals (the timing of codes and carriers in the GNSS signals) received at the antenna 115 in conjunction with the correction data received from the correction system and one or more transformed atmospheric correction values to mitigate errors (e.g., orbit, clock, atmosphere, and/or multipath errors), resulting in the calculation of decimeter-level or better positioning accuracy with shorter convergence time, as will be described in further detail below.

Figure 2:
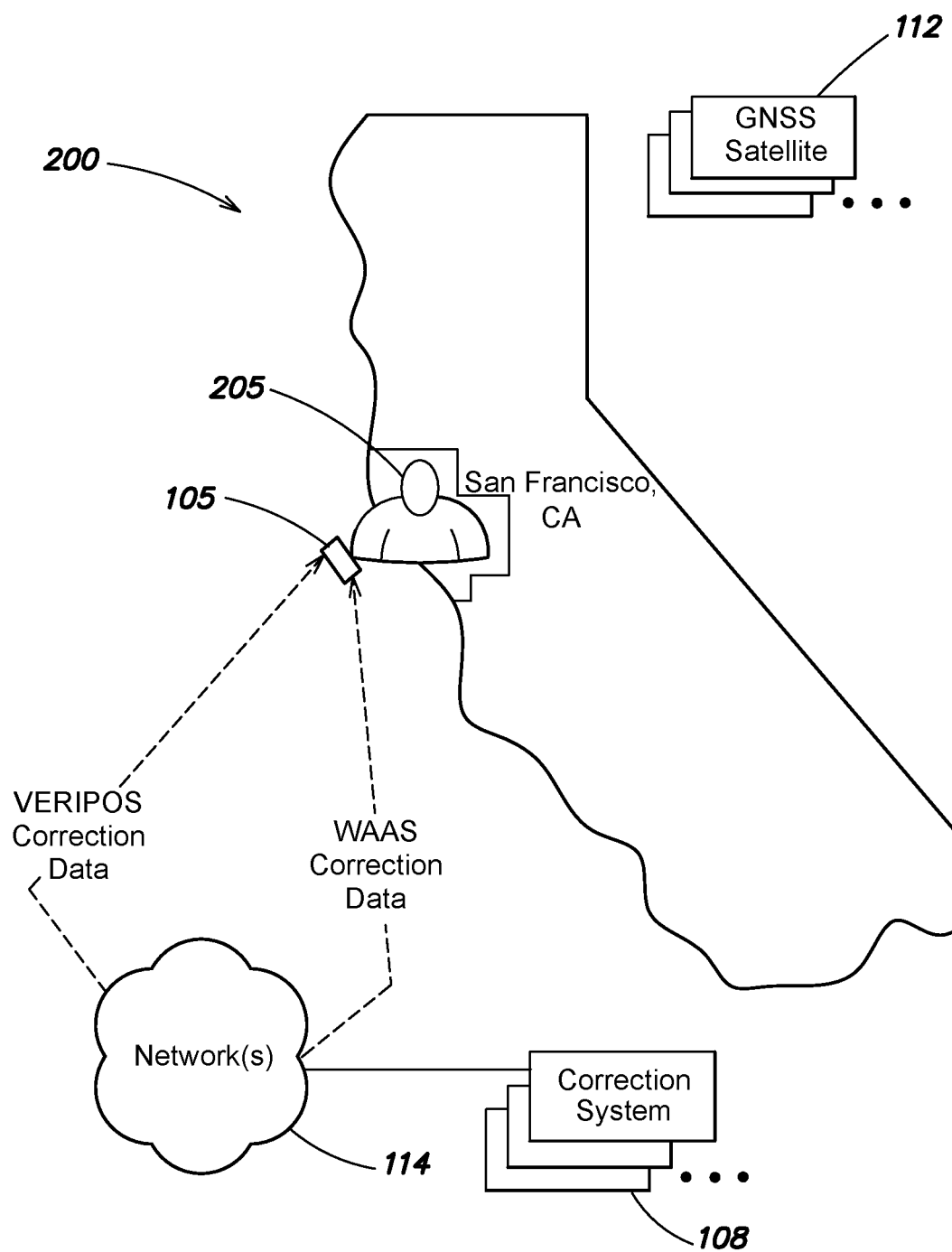
FIG. 2 depicts an environment in which the system of FIG. 1 may operate in accordance with an illustrative embodiment of the invention.

FIG. 2 is an exemplary environment 200 in which the system of FIG. 1 may operate. As depicted in FIG. 2, a user 205 (hereinafter "John") is operating the client device 105 while he is in San Francisco, Calif. In addition, and for this example, client device 105 is a cellular phone and John is a paid subscriber to the TerraStar® system. As such, the client device 105 receives the TerraStar® correction data over the network 114. For example, the client device 105 may utilize the one or more satellite signals received from the GNSS satellites 112 and the TerraStar® correction data to calculate position while mitigating errors.

However and for this example, assume that the atmospheric correction values provided by TerraStar® are not available or not sufficiently accurate/reliable in San Francisco, Calif. Consequently and in this example, John may have to wait 2-3 hours (i.e., convergence time) to achieve decimeter-level or better positioning accuracy utilizing the TerraStar® correction with single-frequency GNSS receiver while in San Francisco, Calif. In addition, the atmospheric correction data from a different correction system (i.e., TerraStar®, OmniSTAR®, StarFire™, and the WAAS) cannot simply be substituted for the atmospheric correction data from the TerraStar® system, since each correction system utilizes its own specific algorithm(s), data, and/or information to implement a correction technique to produce its correction data.

In addition and in this example, let it be assumed that the atmospheric correction data provided by the WAAS for San Francisco, Calif. is sufficiently accurate/reliable such that convergence time would be significantly reduced, on the order of 1.5-2 hours, to achieve decimeter-level or better positioning accuracy.

Therefore and in this example, client device 105 may receive the TerraStar® correction data as a paid subscriber and may also receive the WAAS correction data that, for example, is available free of charge to GNSS receivers being utilized by civilians in North America.

Specifically, the client device 105 may receive, over the network 114 and from the TerraStar® system, first correction data that includes at least an orbit correction value, a clock correction value, and a code or phase bias correction value associated with a particular GNSS satellite. For this example, the particular satellite is identified by identifier "19" (hereinafter "GNSS satellite 19"). In addition, the orbit correction value is −20124463.08 meters (m), the clock correction value is −132639.48 m, and the bias correction value is −0.28 m for the TerraStar® correction data. As such, the correction data transformation subsystem 117 sums the first correction data (−20124463.08 m+−132639.48 m+−0.28 m) to calculate a first total correction value that equals −20257102.84 m and represents the TerraStar® full range-level correction value for GNSS satellite 19.

Further, the client device 105 may receive, over the network 114 and from the WAAS, second correction data that includes at least an orbit correction value, a clock correction value, a code or phase bias correction value, and an atmospheric correction value associated with GNSS satellite 19. For this example, the orbit correction value is −20124464.46 m, the clock correction value is −132633.86 m, the code bias correction value is 0 m, and the atmospheric correction value (e.g., ionospheric correction value) is 1.12 m for the WAAS correction data. The atmospheric correction value may be obtained from a wide-area ionosphere model provided by the WAAS. The correction data transformation subsystem 117 sums the second orbit correction value, the second clock correction value, and the second code bias correction (−20124464.46 m+−132633.86 m+0 m) to calculate a second total correction value that equals −20257098.32 m and represents the WAAS full range-level correction value for GNSS satellite 19.

The correction data transformation subsystem 117 calculates a difference between the TerraStar® full range-level correction value and the WAAS full-range level correction value associated with GNSS satellite 19. Specifically, the correction data transformation subsystem 117 subtracts the first total correction value (−20257102.84 m) from the second total correction (−20257098.32 m) to calculate a full range-level correction difference value that equals 4.52 m for GNSS satellite 19.

The correction data transformation subsystem 117 adjusts the atmospheric correction data, received from the WAAS, utilizing the full range-level correction difference value representing the difference between the full range-level correction values associated with the two different correction systems. Specifically, the correction data transformation subsystem 117 subtracts the full range-level correction difference value (4.52 m) from the atmospheric correction value (1.12 m) to calculate an adjusted atmospheric correction value that equals −3.40 m for GNSS satellite 19.

The adjusted atmospheric correction value may then be utilized by the GNSS receiver 120 with the first correction data to mitigate errors and reduce convergence time when computing position with decimeter or better positioning accuracy. Specifically, the one or more processors 113 calculate position utilizing information from the GNSS signals (e.g., timing of codes and carriers in the GNSS signals) received at the antenna 115 in conjunction with the TerraStar® correction data and the adjusted atmospheric correction value to mitigate errors, resulting in the calculation of decimeter-level or better positioning accuracy with shorter convergence time.

More specifically, and in this example, the one or more processors 113 utilize information from the GNSS signals received from the GNSS satellite 19 in conjunction with the TerraStar® orbit correction value of −20124463.08 m, the TerraStar® clock correction value of −132639.48 m, the TerraStar® bias correction value of −0.28 m, and the adjusted correction value calculated of −3.40 m to calculate decimeter-level or better positioning accuracy with shorter convergence time. Advantageously, the atmospheric correction value obtained from the WAAS is transformed such that it can be utilized with the TerraStar® correction values to mitigate error and achieve decimeter-level or better positioning accuracy with shorter convergence time.

Although the example above describes calculating and using a single adjusted atmospheric correction value, it is expressly contemplated that the inventive system and method may illustratively calculate and utilize a plurality of adjusted atmospheric correction values. Specifically, the correction data transformation subsystem 117 may calculate an adjusted atmospheric correction value for each of at least three different GNSS satellites in a similar manner as described above. The correction data transformation subsystem 117 may then utilize information from the GNSS signals received from each of the at least three different GNSS satellite in conjunction with the correction values from a first correction system and the at least three adjusted atmospheric correction values to calculate decimeter-level or better positioning accuracy with shorter convergence time. In addition, it is expressly contemplated that the corrections may follow different sign and unit conventions depending on the implementation.

Specifically, and with reference to the example above, let it be assumed that the correction data transformation subsystem 117 also calculates adjusted atmospheric correction values based on atmospheric correction values received from the WAAS for two other GNSS satellites in a similar manner as described above. For example, the correction data transformation subsystem 117 may calculate adjusted atmospheric correction value of 4.59 m and 4.19 m respectively for GNSS satellites 6 and 24 based on atmospheric correction values received from the WAAS in a similar manner as described above. Therefore, the one or more processors 113 may utilize information from the GNSS signals received from GNSS satellites 19, 6, and 24 in conjunction with TerraStar® correction data (e.g., orbit correction value, clock correction value, and bias correction value) associated with each of GNSS satellites 19, 6, and 24 and the adjusted atmospheric correction values of −3.40 m, 4.59 m, and 4.19 m to calculate decimeter-level or better positioning accuracy with shorter convergence time.

Although the example above describes utilizing TerraStar® correction data with an adjusted atmospheric correction value that is transformed based on an atmospheric correction value received from the WAAS, it is expressly contemplated that correction data from any first correction system may be utilized with an atmospheric correction value received from a second correction system in a similar manner as described above.

For example, the correction data transformation subsystem 117 may adjust an atmospheric correction value received from the WAAS to be utilized with correction data from any other PPP system (e.g., VERIPOS Apex®, OmniSTAR®, and/or StarFire™) in a similar manner as described above. The one or more processors 113 may then utilize information from GNSS satellite signals in conjunction with the correction data from the other PPP system and the adjusted atmospheric correction value to calculate decimeter-level or better positioning accuracy with shorter convergence time.

In addition or alternatively, the correction data transformation subsystem 117 may adjust an atmospheric correction value received from a PPP system (VERIPOS Apex®, TerraStar®, OmniSTAR®, and/or StarFire™) to be utilized with correction data from a different PPP system in a similar manner described above. The one or more processors 113 may then utilize information from the GNSS satellite signals in conjunction with the correction data from the different PPP system with the adjusted atmospheric correction value to calculate decimeter-level or better positioning accuracy with shorter convergence time.

In addition or alternatively, the correction data transformation subsystem 117 may adjust an atmospheric correction value received from a PPP system (VERIPOS Apex®, TerraStar®, OmniSTAR®, and/or StarFire™) to be utilized with correction data received from the WAAS, or any other SBAS system, in a similar manner as described above. The one or more processors 113 may then utilize information from GNSS satellite signals in conjunction with the correction data from the WAAS, or any other SBAS system, with the adjusted atmospheric correction value to calculate decimeter-level or better positioning accuracy with shorter convergence time in the manner described above.

Therefore, the correction data transformation subsystem 117 may adjust an atmospheric correction value received from any one of a variety of different correction systems to be utilized with correction data received from a different correction system in a similar manner as described above. The one or more processors 113 may then utilize information from GNSS satellite signals in conjunction with the correction data from the different correction system and the adjusted atmospheric correction value to calculate decimeter-level or better positioning accuracy with shorter convergence time.

Figure 3:
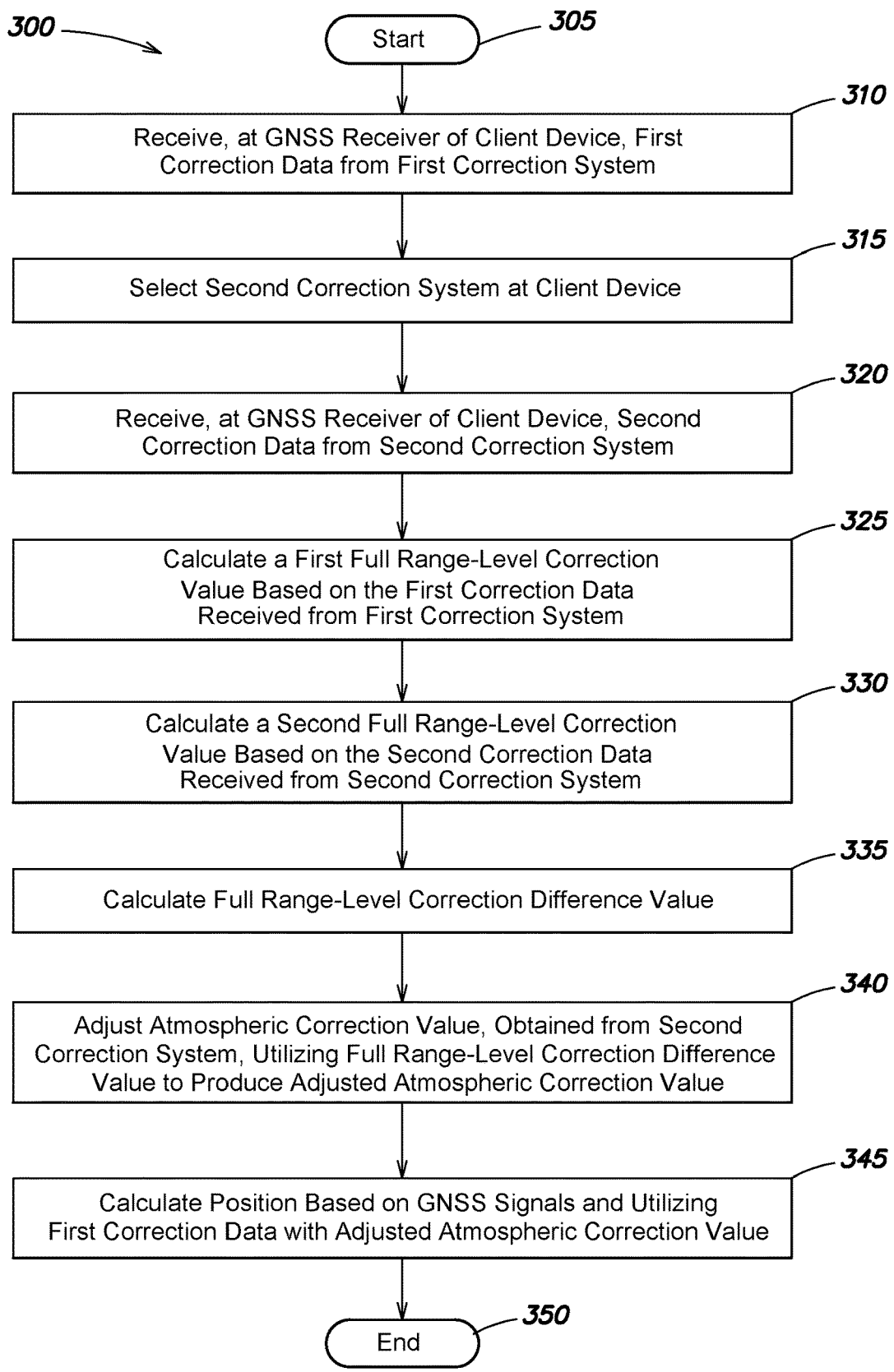
FIG. 3 is an exemplary flow chart for transforming atmospheric correction data between correction systems in accordance with an illustrative embodiment of the invention.

FIG. 3 is an exemplary flow chart for transforming atmospheric correction data between correction systems in accordance with an illustrative embodiment of the invention. It should be understood that fewer or additional steps may be performed, and the steps may be performed in a different order. The procedure 300 starts at step 305 and continues to step 310 where a GNSS receiver 120, at a client device 105, receives first correction data from a first correction system 108. The first correction system may be, for example, VERIPOS Apex®, TerraStar®, OmniSTAR®, StarFire™, or the WAAS. In addition, the correction data may include, but is not limited to, a first orbit correction value, a first clock correction value, and a first code or phase bias correction value, wherein the first correction data is associated with a selected GNSS satellite. The GNSS receiver 120 may receive the first correction data from a device associated with the first correction system and over the network 114. For example, and with reference to FIG. 2, the first correction system may be the TerraStar® system and the first orbit correction value is −20124463.08 m, the first clock correction value is −132639.48 m, and the first code bias correction value is −0.28 m.

The procedure continues to step 315 where a correction data transformation subsystem 117, of the GNSS receiver 120, selects a different correction system (i.e., second correction system). For example, the GNSS receiver may select a different correction system that provides more accurate atmospheric corrections than the first correction system in a location where the client device 105 is operating.

Specifically, the GNSS receiver may utilize one or more algorithms, historical data, and/or any other type of received/stored information in determining that the second correction system provides more accurate atmospheric corrections than the first correction system in a location where the client device 105 is operating. For example, and with reference to FIG. 2, the GNSS receiver may determine that the WAAS provides more accurate atmospheric corrections than the TerraStar® system in San Francisco, Calif. or the TerraStar® system doesn't have atmospheric corrections available in that area. Alternatively, the user may utilize a graphical user interface, for example, on the client device 105 to select the second correction system.

The procedure continues to step 320 where the GNSS receiver 120, at the client device 105, receives second correction data from the second correction system. The second correction system (e.g., VERIPOS Apex®, TerraStar®, OmniSTAR®, StarFire™, or the WAAS) is any correction system that is different than the first correction system. For example, and with reference to FIG. 2, the second correction system may be the WAAS. In addition, the second correction data may include, but is not limited to, a second orbit correction value, a second clock correction value, a second code or phase bias correction value, and an atmospheric correction value associated with the selected GNSS satellite. For example, and with reference to FIG. 2, the GNSS receiver 120 may receive the second correction data from a device associated with the WAAS and the atmospheric correction value associated with the selected GNSS satellite may be obtained from a wide-area ionosphere model provided by the WAAS. Further, and with reference to FIG. 2, the second orbit correction value is −20124464.46 m, the second clock correction value is −132633.86 m, the second code bias correction value is 0 m, and the atmospheric correction value (e.g., ionospheric correction value) is 1.12 m.

The procedure continues to step 325 where the correction data transformation subsystem 117, of the GNSS receiver 120, calculates a first full range-level correction value based on the first correction data received from the first correction system. Specifically, the correction data transformation subsystem 117 sums the first orbit correction value, the first clock correction value, and the first code bias correction value associated with the selected GNSS satellite and provided by the first correction system to calculate the first full range-level correction value. For example, and with reference to FIG. 2, the correction data transformation subsystem 117 calculates the first full range-level correction value to be −20257102.84 m (e.g., −20124463.08 m+−132639.48 m+−0.28 m) for GNSS satellite 19 and based on the TerraStar® correction data.

The procedure continues to step 330 where the correction data transformation subsystem 117, of the GNSS receiver 120, calculates a second full range-level correction value based on the second correction data received from the second correction system. Specifically, the correction data transformation subsystem 117 sums the second orbit correction value, the second clock correction value, and the second code bias correction value associated with the selected GNSS satellite and provided by the second correction system to calculate the second full range-level correction value. For example, and with reference to FIG. 2, the correction data transformation subsystem 117 calculates the second full range-level correction value to be −20257098.32 m (e.g., −20124464.46 m+−132633.86 m+0 m) for GNSS satellite 19 and based on the WAAS correction data.

The procedure continues to step 335 where the correction data transformation subsystem 117 calculates a full range-level correction difference value that is a difference between the first full range-level correction value and the second full range-level correction value. Specifically, the correction data transformation subsystem 117 subtracts the first full range-level correction value from the second full range-level correction value. For example, and with reference to FIG. 2, the correction data transformation subsystem 117 subtracts the TerraStar® full range-level correction value (−20257102.84 m) from the WAAS full-range level correction value (−20257098.32 m) to calculate a full range-level correction difference value that equals 4.52 m for GNSS satellite 19.

The procedure continues to step 340 where the correction data transformation subsystem 117 adjusts the atmospheric correction value, obtained from the second correction system, utilizing the full range-level correction difference value to calculate an adjusted atmospheric correction value that can be utilized with the first correction data obtained from the first correction system. Specifically, and with reference to FIG. 2, the correction data transformation subsystem 117 subtracts the full range-level correction difference value (4.52 m) from the atmospheric correction value (1.12 m) received from the second correction system to calculate the adjusted atmospheric correction value that equals −3.40 m.

The procedure continues to step 345 where the one or more processors 113, of the GNSS receiver 120, calculate position utilizing information from the GNSS signals (e.g., the timing of codes and carriers in the GNSS signals) received at the antenna 115 in conjunction with the first correction data and the adjusted atmospheric correction values to mitigate errors (e.g., orbit, clock, atmosphere, and/or multipath errors), resulting in the calculation of decimeter-level or better positioning accuracy with shorter convergence time. For example, and with reference to FIG. 2, the one or more processors 113 utilize the GNSS signals received from the GNSS satellite 19 in conjunction with the TerraStar® orbit correction value of −20124463.08 m, the TerraStar® clock correction value of −132639.48 m, the TerraStar® bias correction value of −0.28 m, and the transformed correction value calculated of −3.40 m to calculate decimeter-level or better positioning accuracy with shorter convergence time.

Illustratively, the correction data transformation subsystem 117 adjusts the atmospheric correction value associated with at least three different GNSS satellites and received from one or more different correction systems (i.e., different from a first correction system) to respectively produce three adjusted atmospheric correction values in a similar manner as described above. The one or more processes may then utilize the GNSS satellite signals received from the at least three GNSS satellites in conjunction with first correction data from the first correction system and the three adjusted atmospheric correction values to calculate decimeter-level or better positioning accuracy with shorter convergence time. In step 350 the procedure ends.

As such, the inventive system and method improves the functioning of the client device 105 and provides an improvement in the existing technology of GNSS systems. Specifically, the inventive system and method reduces convergence time to compute position while mitigating errors. As a result, the processing resources of the client device that are required to compute the position while mitigating the errors are utilized for a shorter period of time, since the position solution can be determined more rapidly, i.e., with shorter convergence time. Therefore and because processing resources are utilized for a shorter period of time, the functioning of the client device 105 is improved.

In addition, the inventive system and method provides an improvement in the field of GNSS systems, since the receiver 120 at the client device 105 can utilize an atmospheric correction received from a particular correction system with correction data received from a different correction system.

The foregoing description described certain example embodiments. It will be apparent, however, that other variations and modifications may be made to the described embodiments, with the attainment of some or all of their advantages. For example, although the correction data transformation subsystem 117 is depicted as being within the GNSS receiver 120, it is expressly contemplated that the correction data transformation subsystem 117 may be a separate component of the client device 105 and may be executed by the processing capabilities of the client device 105. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A Global Navigation Satellite System (GNSS) receiver of a client device configured to receive one or more GNSS satellite signals from a plurality of GNSS satellites, the GNSS receiver comprising:
processor configured to:
receive, from a first correction system, first correction data including at least a first orbit correction value, a first clock correction value, and a first code or phase bias correction value;
sum the first orbit correction value, the first clock correction value, and the first code or phase bias correction value to produce a first full range-level correction value;
receive, from a second correction system, second correction data including at least a second orbit correction value, a second clock correction value, a second code or phase bias correction value, and an atmospheric correction value;
sum the second orbit correction value, the second clock correction value, and the second code or phase bias correction value to produce a second full range-level correction value;
calculate a full range-level difference correction value as a difference between the second full range-level correction value and the first full range-level correction value;
adjust the atmospheric correction value, received from the second correction system, utilizing the full range-level difference correction value to produce an adjusted atmospheric correction value; and
calculate a position utilizing the GNSS satellite signals, the first correction data, and the adjusted atmospheric correction value.

2. The GNSS receiver of claim 1, wherein the first correction system is a Precise Point Positioning (PPP) system.

3. The GNSS receiver of claim 2, wherein the second correction system is a Satellite-based Augmentation System (SBAS).

4. The system of claim 3, wherein the atmospheric correction value is an ionosphere correction value obtained from a wide-area ionosphere model provided by the SBAS.

5. The GNSS receiver of claim 1, wherein the first correction system is a Satellite-based Augmentation System (SBAS).

6. The GNSS receiver of claim 5, wherein the second correction system is a Precise Point Positioning (PPP) system.

7. The system of claim 1, wherein the GNSS receiver is a single-frequency receiver, a dual frequency receiver, or a multi-frequency receiver.

8. The system of claim 1, wherein the first correction data and the second correction data are associated with a same GNSS satellite of the plurality of GNSS satellites.

9. The system of claim 8, wherein the processor is further configured to:
adjust a second atmospheric correction value received from the second correction system and associated with a second GNSS satellite to produce a second adjusted atmospheric correction value;
adjust a third atmospheric correction received from the second correction system and associated with a third GNSS satellite to produce a third adjusted atmospheric correction value; and
calculate the position utilizing the GNSS satellite signals, the first correction data, third correction data from the first correction system associated with the second GNSS satellite, fourth correction data from the first correction system associated with the third GNSS satellite, the adjusted atmospheric correction value, the second adjusted atmospheric correction value, and the third adjusted atmospheric correction value.

10. A method for transforming atmospheric corrections between correction systems, the atmospheric corrections received at a client device including a Global Navigation Satellite System (GNSS) receiver, the method comprising:
receiving, at the client device, first correction data from a first correction system, wherein the first correction data includes at least a first orbit correction value, a first clock correction value, and a first code or phase bias correction value;
receiving, at the client device, second correction data from a second correction system, wherein the second correction data includes at least a second orbit correction value, a second clock correction value, a second code or phase bias correction value, and an atmospheric correction value;
calculating, at the client device, a first full range-level correction value based on the first correction data;
calculating, at the client device, a second full range-level correction value based on the second correction data;
calculating a full range-level difference value as a difference between the first full range-level correction value and the second full range-level correction value;
adjusting, by the client device, the atmospheric correction value received from the second correction system utilizing the full range-level difference value to produce an adjusted atmospheric correction value; and
calculating, by the GNSS receiver, a position based on GNSS signals and utilizing the first correction data with the adjusted atmospheric correction value.

11. The method of claim 10, wherein the first correction system is a Precise Point Positioning (PPP) system.

12. The method of claim 11, wherein the second correction system is a Satellite-based Augmentation System (SBAS).

13. The method of claim 12, wherein the atmospheric correction value is an ionosphere correction value obtained from a wide-area ionosphere model provided by the SBAS.

14. The method of claim 10, wherein the first correction system is a Satellite-based Augmentation System (SBAS).

15. The method of claim 14, wherein the second correction system is a Precise Point Positioning (PPP) system.

16. The method of claim 10, wherein the GNSS receiver is a single-frequency receiver, a dual frequency receiver, or a multi-frequency receiver.

17. The method of claim 10, wherein the first correction data and the second correction data are associated with a same GNSS satellite.

18. The method of claim 17, further comprising:
adjusting, at the client device, a second atmospheric correction value received from the second correction system and associated with a second GNSS satellite to produce a second adjusted atmospheric correction value;
adjusting, at the client device, a third atmospheric correction received from the second correction system and associated with a third GNSS satellite to produce a third adjusted atmospheric correction value; and
calculate, at the client device, the position utilizing the GNSS signals, the first correction data, third correction data from the first correction system associated with the second GNSS satellite, fourth correction data from the first correction system associated with the third GNSS satellite, the adjusted atmospheric correction value, the second adjusted atmospheric correction value, and the third adjusted atmospheric correction value.

19. A Global Navigation Satellite System (GNSS) receiver of a client device configured to receive one or more GNSS satellite signals from a plurality of GNSS satellites, the GNSS receiver comprising:
a processor configured to:
receive first correction data from a first correction system;
receive second correction data from a second correction system, wherein the second correction data includes an atmospheric correction value;
adjust the atmospheric correction value received from the second correction system utilizing the first correction data received from the first correction system with the second correction data received from the second correction system to produce an adjusted atmospheric correction value, wherein the adjusted atmospheric correction value is based on at least a difference between the first correction data and the second correction data; and
calculate a position utilizing the GNSS satellite signals, the first correction data, and the adjusted atmospheric correction value.

20. The GNSS receiver of claim 19, wherein the first correction system is a Precise Point Positioning (PPP) system and the second correction system is a Satellite-based Augmentation System (SBAS).

* * * * *